Nov. 25, 1930. K. EISENBURGER 1,783,075
INTERNAL COMBUSTION ENGINE
Filed Dec. 16, 1929

INVENTOR:
Kuno Eisenburger
BY
Pennie Davis Marvin & Edmonds
ATTORNEY.

Patented Nov. 25, 1930

1,783,075

UNITED STATES PATENT OFFICE

KUNO EISENBURGER, OF BISTRITA, RUMANIA, ASSIGNOR TO THE FIRM OF SULZER FRÈRES SOCIÉTÉ ANONYME, OF WINTERTHUR, SWITZERLAND

INTERNAL-COMBUSTION ENGINE

Application filed December 16, 1929, Serial No. 414,551, and in Switzerland December 13, 1928.

This invention relates to internal combustion engines operating on the four-stroke cycle and has particular reference to such engines in which air is admitted into the working cylinder through valves disposed in the cylinder head and also through ports controlled by the piston.

According to this invention at the beginning of the exhaust stroke air is admitted from the piston controlled ports with a circular or whirling motion into a trough-like depression in the piston head, so that after the waste gases have been driven out there is provided above the piston a layer of pure air which will assist combustion at the next power stroke.

Conveniently one or more non-return valves are provided through which the air passes to the piston controlled inlet ports and this air may be supplied at a higher pressure than the air supplied through the ports disposed in the cylinder head.

Figure 1:
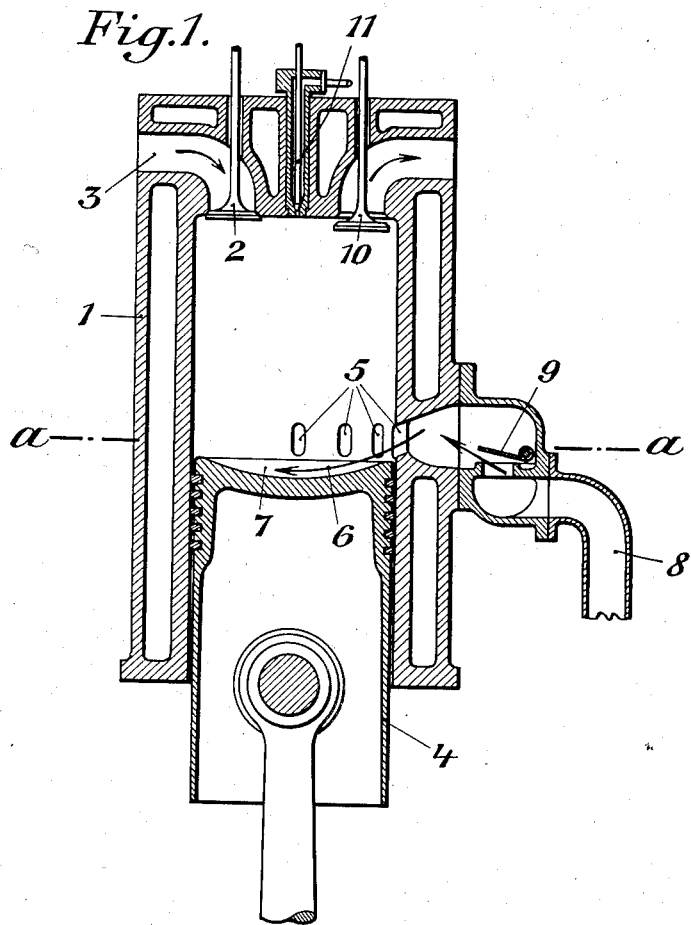
Figure 2:
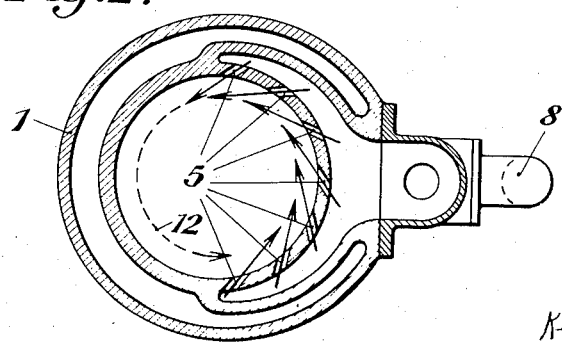

The invention may be carried into practice in various ways but one construction of an internal combustion engine arranged according thereto is diagrammatically illustrated in the accompanying drawings, in which Fig. 1 is a longitudinal section of a piston and cylinder, and Fig. 2 is a sectional plan on the line a—a of Figure 1.

In the construction illustrated air is admitted to the working cylinder 1 through an inlet passage 3 in the cylinder head controlled by a valve 2 and additional air is also admitted through ports 5 controlled by the piston 4. The ports 5 are arranged so that the air stream is deflected in a downward direction as shown by the arrow 6 in Figure 1 towards a dish or trough-like depression 7 in the head of the piston 4. Air is supplied to the ports 5 by a pipe 8, and a non-return valve 9 is provided between the ports and the source of supply to prevent the outflow of the products of combustion when the ports are first opened. The waste products of combustion are exhausted through an exhaust valve 10 and fuel is admitted through a valve 11.

According to the invention air is admitted through the ports 5 at the commencement of each exhaust stroke and this air is tangentially directed across the head of the piston 4 so that a whirling or circular movement is imparted to it as indicated by the arrow 12 in Figure 2. Thus any products of combustion which are still remaining in the dish 7 are swept away, the piston head is cooled, and in addition a layer of pure air is provided above the piston which assists combustion of the next charge. The air inlet, fuel and exhaust valves may be controlled by any suitable means and the opening and closing of these valves can be regulated in accordance with working conditions.

It will be appreciated that the construction above described is given by way of example only and may be modified without departing from the scope of the invention.

What I claim is:

In a four-stroke fuel-injection combustion engine, a cylinder and an air-inlet valve in the head thereof for the main scavenging air, a piston having a concave head, said cylinder wall having downwardly and tangentially opening ports therein for the admission of auxiliary scavenging air, said ports being nected to a manifold surrounding at least a part of said cylinder wall, a header connected to the outer end of said manifold by one side and a source of compressed air by the other side, and a non-return valve in said header for preventing products of combustion from entering the source of compressed air.

In testimony whereof I have affixed my signature.

KUNO EISENBURGER.